(12) United States Patent
Shimazaki et al.

(10) Patent No.: US 12,005,880 B2
(45) Date of Patent: Jun. 11, 2024

(54) VEHICLE BRAKE SYSTEM

(71) Applicants: Toyota Jidosha Kabushiki Kaisha, Toyota (JP); ADVICS CO., LTD., Kariya (JP)

(72) Inventors: Misuzu Shimazaki, Toyota (JP); Yusuke Kamiya, Toyota (JP); Ken Kuzuya, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 362 days.

(21) Appl. No.: 17/573,231

(22) Filed: Jan. 11, 2022

(65) Prior Publication Data
US 2022/0227341 A1 Jul. 21, 2022

(30) Foreign Application Priority Data

Jan. 15, 2021 (JP) ................. 2021-004700

(51) Int. Cl.
B60T 8/94 (2006.01)
B60T 13/66 (2006.01)
B60T 17/22 (2006.01)
F16D 66/00 (2006.01)

(52) U.S. Cl.
CPC .............. *B60T 8/94* (2013.01); *B60T 13/662* (2013.01); *B60T 17/22* (2013.01); *B60T 2201/03* (2013.01); *B60T 2270/402* (2013.01); *B60T 2270/406* (2013.01); *B60T 2270/88* (2013.01); *F16D 2066/001* (2013.01)

(58) Field of Classification Search
CPC ........ B60T 13/662; B60T 8/94; B60T 8/4081; B60T 7/042; B60T 17/22; B60T 2270/402; B60T 2270/406; B60T 2270/88; B60T 2201/03; F16D 2066/001
See application file for complete search history.

(56) References Cited

U.S. PATENT DOCUMENTS

2017/0072932 A1* 3/2017 Steward ................. B60T 17/22
2018/0065611 A1* 3/2018 Matsuura ................ B60T 8/171
2019/0381978 A1* 12/2019 Ishida ...................... B60T 8/96

FOREIGN PATENT DOCUMENTS

JP 2018-111423 A 7/2018

* cited by examiner

*Primary Examiner* — Vishal R Sahni
(74) *Attorney, Agent, or Firm* — Sughrue Mion, PLLC

(57) ABSTRACT

A vehicle brake system, including: a first hydraulic-pressure control mechanism and a second hydraulic-pressure control mechanism configured to control a braking force; and a controller including a first-abnormal-state detecting device configured to detect whether the first hydraulic-pressure control mechanism is in a first abnormal state, a second-abnormal-state detecting device configured to detect whether the first hydraulic-pressure control mechanism is in a second abnormal state that the first hydraulic-pressure control mechanism reaches before reaching the first abnormal state, and an assist control device configured to control the second braking-force control mechanism so as to control the braking force when an assist wait time elapses after the second-abnormal-state detecting device has detected that the first hydraulic-pressure control mechanism is in the second abnormal state, the assist wait time being determined based on a temperature of a working fluid obtained by a temperature obtaining device of the brake system.

6 Claims, 9 Drawing Sheets

VEHICLE BRAKE SYSTEM

CROSS REFERENCE TO RELATED APPLICATION

The present application claims priority to Japanese Patent Application No. 2021-004700, which was filed on Jan. 15, 2021, the disclosure of which is herein incorporated by reference in its entirety.

BACKGROUND

Technical Field

The following disclosure relates to a brake system for a vehicle configured to apply a braking force to the vehicle.

Description of Related Art

Patent Document 1 (Japanese Patent Application Publication No. 2018-111423) discloses a vehicle hydraulic brake system in which a hydraulic pressure in a hydraulic brake is controlled based on one of first target data and second target data. In the disclosed system, a determination time for the second target data is shortened when the first target data is not input for a first reference determination time as a determination time. The configuration enables early detection of an abnormal non-input state of the target data and early start of a backup control, thus preventing or reducing a shortage of a braking force that arises from the abnormality.

SUMMARY

An aspect of the present disclosure is directed to a vehicle brake system that prevents or reduces a shortage of a braking force in a time period from a time point of starting detection of the presence or absence of an abnormality of a first hydraulic-pressure control mechanism to a time point of determining the presence or absence of the abnormality, while preventing or reducing a decrease in an accuracy of detecting the abnormality of the first hydraulic-pressure control mechanism.

In the vehicle brake system, when a temperature is low, actuation of the first hydraulic-pressure control mechanism may be delayed. If a monitoring time is short in such a case, the first hydraulic-pressure control mechanism may be erroneously detected to be in an abnormal state even if the first hydraulic-pressure control mechanism is normal. For preventing such erroneous detection, the monitoring time is made longer in detecting whether the first hydraulic-pressure control mechanism is in the abnormal state. However, the increase in the monitoring time undesirably causes the braking force to remain insufficient for a long time till the time point of determining whether the first hydraulic-pressure control mechanism is in the abnormal state.

In the vehicle brake system according to the present disclosure, when the first hydraulic-pressure control mechanism is detected to be in a second abnormal state that the first hydraulic-pressure control mechanism reaches before reaching a first abnormal state, a second braking-force control mechanism is operated after a lapse of an assist wait time that is determined based on the temperature. This configuration prevents the shortage of the braking force while preventing a decrease in the accuracy of detection as to whether the first hydraulic-pressure control mechanism is in the first abnormal state.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
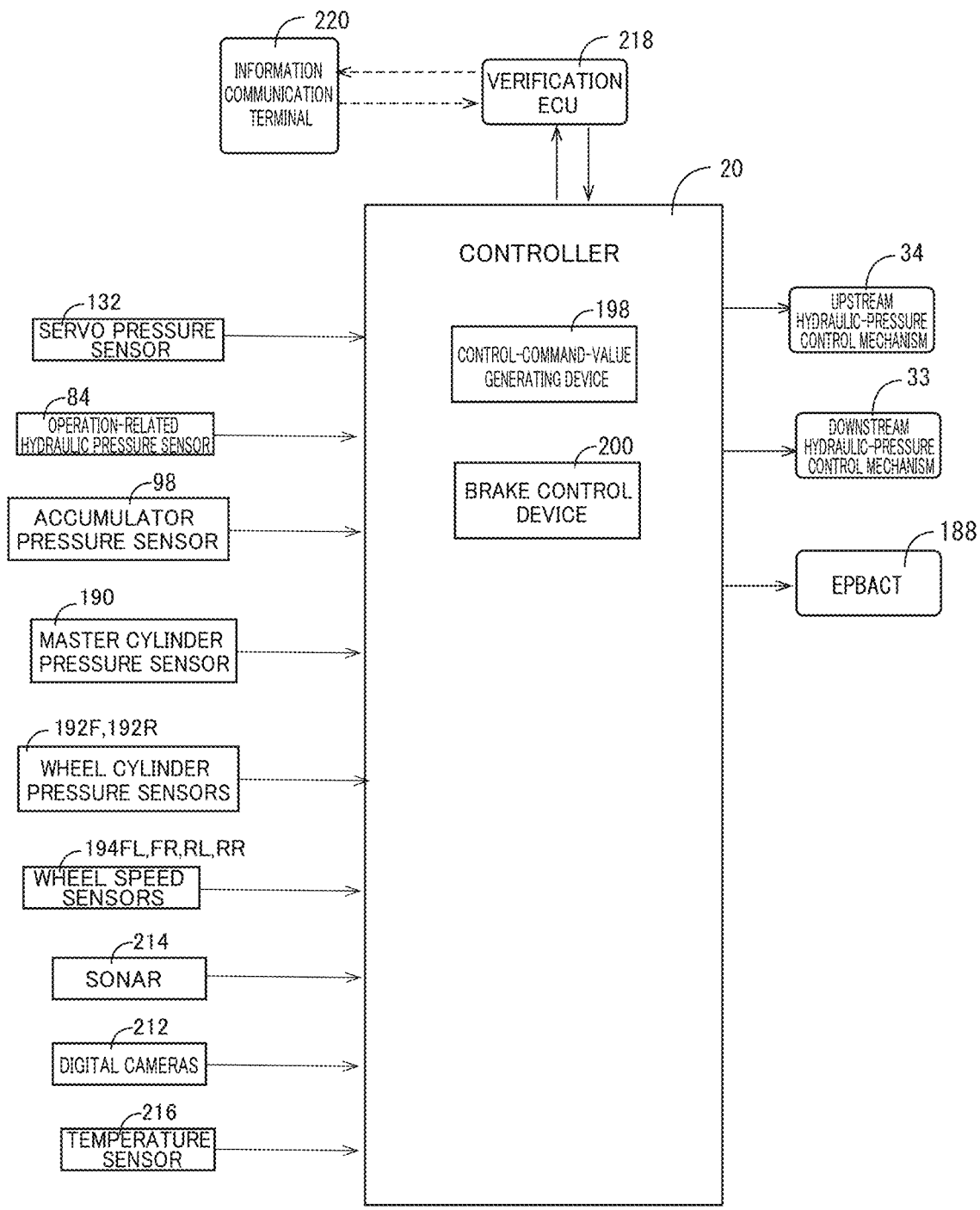
FIG. 1 is a conceptual view of a controller and components therearound in a vehicle brake system according to one embodiment of the present disclosure.

Referring to the drawings, there will be hereinafter described in details a vehicle brake system according to one embodiment of the present disclosure.

Figure 2:
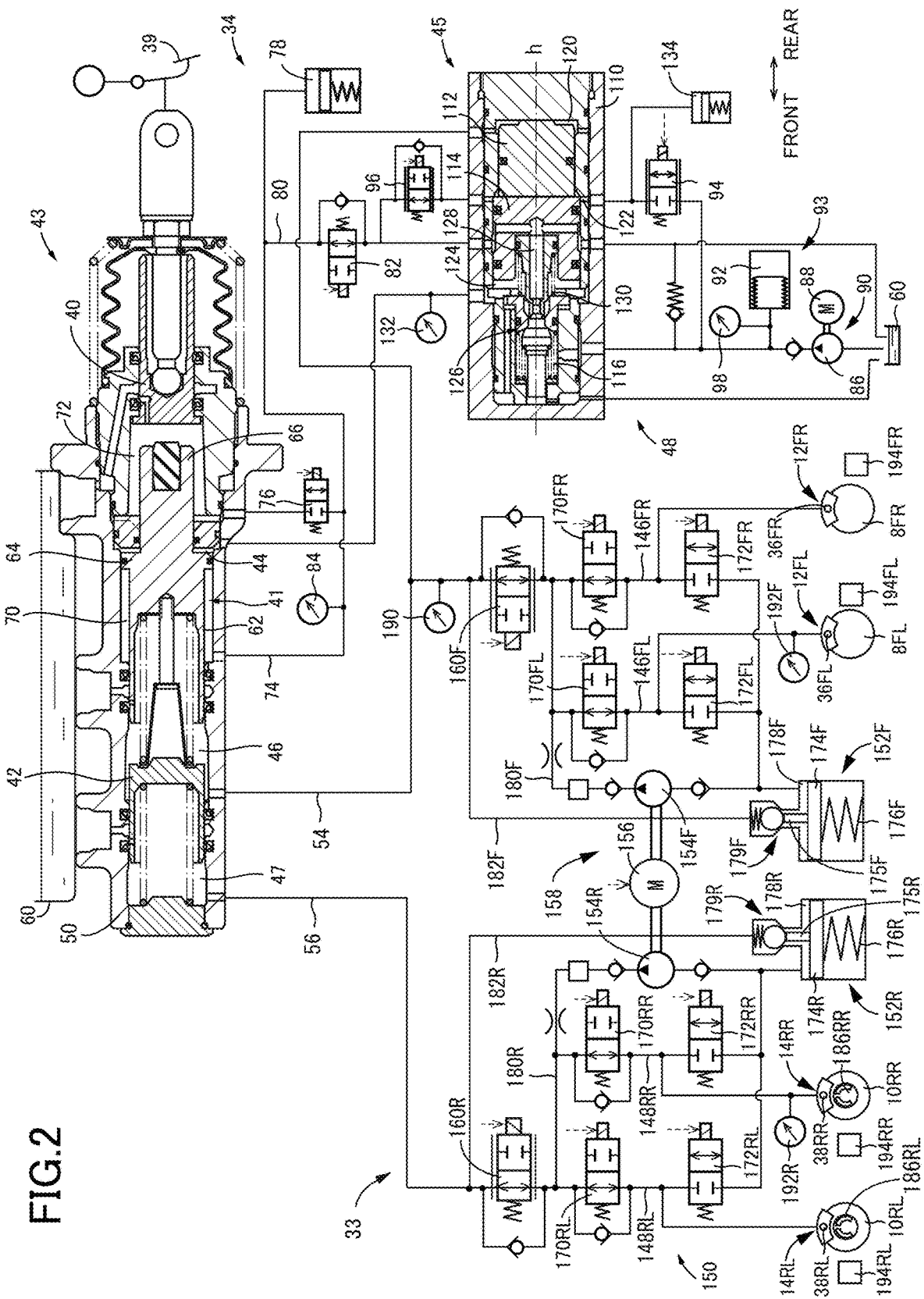
FIG. 2 is a circuit diagram of the brake system.

As illustrated in FIG. 2, the vehicle brake system according to the present embodiment is a hydraulic brake system including hydraulic brakes 12FL, 12FR respectively provided for front left and right wheels 8FL, 8FR and hydraulic brakes 14RL, 14RR respectively provided for rear right and left wheels 10RL, 10RR. The present brake system includes an upstream hydraulic-pressure control mechanism 34 as a first braking-force control mechanism and a first hydraulic-pressure control mechanism, a downstream hydraulic-pressure control mechanism 33 as a second braking-force control mechanism and a second hydraulic-pressure control mechanism, and a controller 20 (FIG. 1) constituted principally by a computer.

In the following description, components, such as the hydraulic brakes, will be referred to without suffixes such as FL, FR, RL, RR, F, R indicative of the corresponding wheel positions where it is not necessary to distinguish the components by their wheel positions.

As illustrated in FIG. 2, the upstream hydraulic-pressure control mechanism 34 includes (a) a master cylinder 43 including: an input piston 40 coupled to a brake pedal 39 as a brake operating member operable by a driver and two pressurizing pistons 41, 42 and (b) a rear-hydraulic-pressure control device 48 including a regulator 45 connected to a rear chamber 44 provided rearward of the pressurizing piston 41 of the master cylinder 43. The rear-hydraulic-pressure control device 48 controls a hydraulic pressure in the rear chamber 44 to thereby control a hydraulic pressure in the pressurizing chambers 46, 47 respectively located frontward of the corresponding pressurizing pistons 41, 42.

The pressurizing pistons 41, 42 and the input piston 40 are fluid-tightly and slidably disposed in a housing 50 of the master cylinder 43 so as to be arranged in series with one another. The wheel cylinders 36 of the hydraulic brakes 12 provided for the front left and right wheels 8 are connected to the pressurizing chamber 46 via a fluid passage 54 while the wheel cylinders 38 of the hydraulic brakes 14 provided for the rear left and right wheels 10 are connected to the pressurizing chamber 47 via a fluid passage 56. The pressurizing pistons 41, 42 are urged in a backward direction by respective return springs. When the pressurizing pistons 41, 42 are located at respective back end positions, the pressurizing chambers 46, 47 are in communication with a master reservoir 60.

The pressurizing piston 41 of the master cylinder 43 has a generally stepped shape. The pressurizing piston 41 includes (a) a front piston portion 62 located at a front portion of the pressurizing piston 41, (b) an intermediate piston portion 64 located at an intermediate portion of the pressurizing piston 41 so as to radially protrude, and (c) a rear small-diameter portion 66 located at a rear portion of the pressurizing piston 41 and having a diameter smaller than a diameter of the intermediate piston portion 64. The front piston portion 62, the intermediate piston portion 64, and the rear small-diameter portion 66 are fluid-tightly and slidably disposed in the housing 50. A space in front of the front piston portion 62 is the pressurizing chamber 46, and a space in front of the intermediate piston portion 64 is an annular chamber 70. A chamber located at a rear of the intermediate piston portion 64 and defined by the housing 50, the rear small-diameter portion 66, and the intermediate piston portion 64 is the rear chamber 44.

The input piston 40 is located rearward of the pressurizing piston 41, and a separated chamber 72 is defined between the rear small-diameter portion 66 and the input piston 40. The brake pedal 39 is linked to a rear portion of the input piston 40 via an operating rod (hereinafter simply referred to as "rod" where appropriate) and other components.

The annular chamber 70 and the separated chamber 72 are connected to each other via a connecting passage 74. A communication control valve 76 is provided in the connecting passage 74. The communication control valve 76 is a normally-closed electromagnetic open/close valve. The communication control valve 76 is placed in an open state when the brake pedal 39 is operated or when a main switch of the vehicle is turned to ON, for instance. Thus, the communication control valve 76 is basically in the open state. A portion of the connecting passage 74 located on one of opposite sides of the communication control valve 76 that is closer to the annular chamber 70 is connected to a stroke simulator 78 and is connected to the master reservoir 60 via a reservoir passage 80. A reservoir cut-off valve 82, which is a normally-open electromagnetic open/close valve, is provided in the reservoir passage 80.

A hydraulic pressure sensor 84 is provided at the above-indicated portion of the connecting passage 74 located on the one of opposite sides of the communication control valve 76 that is closer to the annular chamber 70. The hydraulic pressure sensor 84 detects a hydraulic pressure in the annular chamber 70 and the separated chamber 72 in a state in which the annular chamber 70 and the separated chamber 72 are in communication with each other and are isolated from the master reservoir 60. The hydraulic pressure level in the annular chamber 70 and the separated chamber 72 corresponds to a magnitude of an operation force of the brake pedal 39. In this sense, the hydraulic pressure sensor 84 will be hereinafter referred to as an "operation-related hydraulic pressure sensor".

The rear-hydraulic-pressure control device 48 includes a high pressure source 93, a hydraulic-pressure control valve device, etc., in addition to the regulator 45. The high pressure source 93 includes: a pump device 90 including a pump 86 and a pump motor 88; and an accumulator 92, for instance. The hydraulic-pressure control valve device controls a hydraulic pressure in a control chamber 122 that will be explained. The hydraulic-pressure control valve device includes a pressure-increase control valve 94, a pressure-decrease control valve 96, etc.

The accumulator 92 accumulates, in a pressurized state, a working fluid ejected from the pump device 90. An accumulator pressure that is a hydraulic pressure of the working fluid accumulated in the accumulator 92 is detected by an accumulator pressure sensor 98. The pump motor 88 is controlled such that the accumulator pressure detected by the accumulator pressure sensor 98 is kept within a predetermined range.

The regulator 45 includes (d) a housing 110 and (e) a pilot piston 112 and a control piston 114 disposed in the housing 110 so as to be arranged in series in a direction parallel to an axis h. A high-pressure chamber 116 is formed in the housing 110 at a position in front of the control piston 114. The high-pressure chamber 116 is connected to the high pressure source 93. A space between the pilot piston 112 and the housing 110 is a pilot pressure chamber 120. A space at a rear of the control piston 114 is the control chamber 122. A space in front of the control piston 114 is a servo chamber 124 as an output chamber. A high-pressure supply valve 126 is provided between the servo chamber 124 and the high-pressure chamber 116. The high-pressure supply valve 126 is a normally-closed valve that isolates the servo chamber 124 and the high-pressure chamber 116 from each other in a non-operating state of the regulator 45. The control piston 114 is urged in the backward direction by a return spring 130.

A low-pressure passage 128 is formed in the control piston 114 so as to communicate with the master reservoir 60 all the time. The low-pressure passage 128 is open in a front end of the control piston 114. The opening is opposed to the high-pressure supply valve 126. Thus, when the control piston 114 is located at its back end position, the servo chamber 124 is isolated from the high-pressure chamber 116 and communicates with the master reservoir 60 via the low-pressure passage 128. When the control piston 114 is moved forward and the opening of the low-pressure passage 128 is accordingly closed, the servo chamber 124 is isolated from the master reservoir 60, and the high-pressure supply valve 126 is opened so that the servo chamber 124 is brought into communication with the high-pressure chamber 116.

The pressurizing chamber 46 is connected to the pilot pressure chamber 120. The pilot pressure chamber 120 and the pressurizing chamber 46 are held in communication with each other all the time. Thus, the hydraulic pressure in the pressurizing chamber 46 acts on the pilot piston 112 all the time.

The rear chamber 44 is connected to the servo chamber 124. The servo chamber 124 and the rear chamber 44 are held in communication with each other all the time. Thus, a servo pressure Ps, which is a hydraulic pressure in the servo chamber 124, is basically equal to the hydraulic pressure in the rear chamber 44. The servo pressure Ps is detected by a servo pressure sensor 132.

The pressure-increase control valve (SLA) 94 and the pressure-decrease control valve (SLR) 96 are connected to the control chamber 122. The pressure-increase control valve 94 is provided between the control chamber 122 and the high pressure source 93, and the pressure-decrease control valve 96 is provided between the control chamber 122 and the master reservoir 60. An electric current supplied to coils of the pressure-increase control valve 94 and the pressure-decrease control valve 96 is controlled to control the hydraulic pressure in the control chamber 122. (The electric current will be hereinafter referred to as a "supply current" where appropriate. The same applies to other electromagnetic valves.) A damper 134 is connected to the control chamber 122, and the working fluid flows between the control chamber 122 and the damper 134.

In the present embodiment, a relationship between the hydraulic pressure of the control chamber 122 and the servo pressure Ps of the servo chamber 124 in the regulator 45 and a relationship between the hydraulic pressure of the rear chamber 44 and the hydraulic pressure of the pressurizing chambers 46, 47 in the master cylinder 43 are determined based on the configurations of the regulator 45 and the master cylinder 43. Accordingly, the hydraulic pressure of the control chamber 122 is controlled such that the hydraulic pressure of the pressurizing chambers 46, 47 becomes close to a target hydraulic pressure.

The downstream hydraulic-pressure control mechanism 33 includes, for instance, (a) a slip control valve device 150, (b) a pump device 158 including: pumps 154F, 154R configured to pump up the working fluid in pressure-reduction reservoirs 152F, 152R to eject the working fluid toward an upstream side of the slip control valve device 150; and a pump motor 156, and (c) normally-open hydraulic pressure control valves 160F, 160R disposed between the pumps 154F, 154R and the pressurizing chambers 46, 47 of the master cylinder 43. The hydraulic pressure control valves 160F, 160R control a pressure difference between the hydraulic pressure in the pressurizing chambers 46, 47 of the master cylinder 43 and a hydraulic pressure in the wheel cylinders 36FR, 36FL, 38RR, 38RL of the hydraulic brakes 12FL, 12FR, 14RL, 14RR.

The downstream hydraulic-pressure control mechanism 33 has front and rear lines. In the front-wheel-side line, there are connected, to the fluid passage 54, individual passages 146FL, 146FR that are connected respectively to the wheel cylinders 36FL, 36FR of the front left and right wheels 8FL, 8FR. Pressure-hold valves 170FL, 170FR are provided respectively in the individual passages 146FR, 146FL. The wheel cylinders 36FL, 36FR are connected to a fluid chamber 178F of the pressure-reduction reservoir 152F via corresponding pressure reduction passages in which pressure-reduction valves 172FL, 172FR are respectively provided.

In the rear-wheel-side line, there are connected, to the fluid passage 56, individual passages 148RL, 148RR that are connected respectively to the wheel cylinders 38RL, 38RR of the rear left and right wheels 10RL, 10RR. Pressure-hold valves 170RL, 170RR are provided respectively in the individual passages 148RL, 148RR. A pressure-reduction valve 172RL is provided between the wheel cylinder 38RL and a fluid chamber 178R of the pressure-reduction reservoir 152R, and a pressure-reduction valve 172RR is provided between the wheel cylinder 38RR and the fluid chamber 178R of the pressure-reduction reservoir 152R. The pressure-hold valves 170, the pressure-reduction valves 172, the pressure-reduction reservoirs 152, etc., constitute the slip control valve device 150.

Hereinafter, the front-wheel-side line will be explained, and an explanation of the rear-wheel-side is dispensed with.

The pressure-reduction reservoir 152F includes a housing, a partition member 174F slidably disposed in the housing, and an elastic member 176F provided on one of opposite sides of the partition member 174F in the housing. A space in the housing located on the other of the opposite sides of the partition member 174F that is remote from the elastic member 176F is the fluid chamber 178F in which the working fluid is stored.

A replenishment valve 179F is provided in the fluid chamber 178F. The replenishment valve 179F includes a valve seat, a valve member, a spring for applying an elastic force in a direction in which the valve member is pushed onto the valve seat, and a valve opening member 175F provided on the partition member 174F. In a case where the amount of the working fluid stored in the fluid chamber 178F of the pressure-reduction reservoir 152F is not smaller than a set amount, the valve member is seated on the valve seat, and the replenishment valve 179F is in a closed state. When the amount of the working fluid in the fluid chamber 178F becomes smaller than the set amount, the partition member 174F is moved by an elastic force of the elastic member 176F and the valve opening member 175F causes the valve member to be separated away from the valve seat, so that the replenishment valve 179F is placed in an open state.

The fluid chamber 178F of the pressure-reduction reservoir 152F and a portion of the fluid passage 54 located upstream of positions at which the individual passages 146FL, 146FR are respectively connected (i.e., a portion of the fluid passage 54 located upstream of the pressure-hold valves 170FL, 170FR) are connected via a pump passage 180F in which the pump 154F is provided. In a portion of the pump passage 180F located on the ejection side of the pump 154F, a damper, a restrictor, etc., are provided for preventing or reducing pulsation of the working fluid ejected from the pump 154F. The suction side of the pump 154F is connected to the fluid chamber 178F of the pressure-reduction reservoir 152F via a suction valve.

The hydraulic pressure control valve 160F is provided in a portion of the fluid passage 54 located upstream of a position at which the pump passage 180F is connected. A portion of the fluid passage 54 located upstream of the hydraulic pressure control valve 160F and the pressure-reduction reservoir 152F are connected to each other by a replenishment passage 182F via the replenishment valve 179F.

The hydraulic pressure control valve 160F is configured to control a difference dP in a hydraulic pressure between an upstream side and a downstream side of the hydraulic pressure control valve 160F to a pressure level corresponding to a supply current to the hydraulic pressure control valve 160F. The pressure difference dP increases with an increase in the supply current to the hydraulic pressure control valve 160F, and the hydraulic pressure in the wheel cylinders 36 increases with respect to the hydraulic pressure in the pressurizing chamber 46 of the master cylinder 43.

An electric parking brake 186 is provided for each of the rear left and right wheels 10. The electric parking brakes 186 are operated by an actuator 188 (indicated as "EPBACT 188" in FIG. 1).

In the present embodiment, a master cylinder pressure sensor 190 is provided in the fluid passage 54, and wheel cylinder pressure sensors 192F, 192R are provided respectively in the individual passages 146FL, 148RR. The master cylinder pressure sensor 190 provided in the fluid passage 54 is configured to detect the hydraulic pressure in the pressurizing chamber 46. The hydraulic pressure in the pressurizing chamber 46 and the hydraulic pressure in the pressurizing chamber 47 are estimated to be substantially the same. Thus, the hydraulic pressure in the pressurizing chamber 47 can be estimated based on the detection value of the master cylinder pressure sensor 190. The wheel cylinder pressure sensors 192F, 192R detect the hydraulic pressures in the respective wheel cylinders 36FL, 38RR. When the hydraulic pressures in the wheel cylinders 36FR, 36FL on the front-wheel side are substantially the same and when the hydraulic pressures in the wheel cylinders 38RL, 38RR on the rear-wheel side are substantially the same, detection of the hydraulic pressure in one of the two wheel cylinders enables estimation of the hydraulic pressure in the other of the two wheel cylinders.

Wheel speed sensors 194 are provided respectively for the front left and right wheels 8 and the rear left and right wheels 10 for detecting rotational speeds of the corresponding wheels. A running speed of the vehicle is obtained based on detection values of the wheel speed sensors 194.

As illustrated in FIG. 1, the controller 20 is constituted principally by a computer. The controller 20 includes, a control-command-value generating device 198, a brake control device 200, etc. The controller 20 further includes an executing device, a memory, an input/output device, etc. There are connected, to the input/output device, the operation-related hydraulic pressure sensor 84, the accumulator pressure sensor 98, the servo pressure sensor 132, the master cylinder pressure sensor 190, the wheel cylinder pressure sensors 192, the wheel speed sensors 194, digital cameras 212, sonar 214, and a temperature sensor 216, for instance. To the input/output device, there are further connected, actuators included in the upstream hydraulic-pressure control mechanism 34 (such as the pump motor 88, the pressure-increase control valve 94, the pressure-decrease control valve 96, the communication control valve 76, and the reservoir cut-off valve 82), actuators included in the downstream hydraulic-pressure control mechanism 33 (such as the pump motor 156, the hydraulic pressure control valves 160, the pressure-hold valves 170, and the pressure-reduction valves 172), the actuator 188 for the electric parking brakes 186, etc., via respective drive circuits (not illustrated).

The digital cameras 212 and the sonar 214 are provided at a plurality of portions of the vehicle. The temperature sensor 216 may detect an outside air temperature or may detect a temperature in the brake system. In the present embodiment, a temperature of the working fluid in the brake system is obtained based on the temperature detected by the temperature sensor 216. The outside air temperature or the temperature in the brake system may be estimated as the temperature of the working fluid. The temperature of the working fluid may be obtained based on the detection value of the temperature sensor 216 and an operating time of the hydraulic brakes 12, 14, for instance.

A verification electric control unit (ECU) 218 is connected to the controller 20. The verification ECU 218 is configured to transmit and receive information to and from an information communication terminal 220 present outside the vehicle. For instance, the verification ECU 218 performs verification of ID of the information communication terminal 220 and obtains remote information supplied from the information communication terminal 220, for instance. The remote information is sent to the controller 20 via the verification ECU 218. Here, an automated parking control executed based on the remote information will be referred to as "remote parking control". The remote parking control is executed when a driver, etc., are not on the vehicle.

In the remote parking control, the control-command-value generating device 198 performs image recognition based on images taken by the plurality of digital cameras 212 and information supplied from the sonar 214 and creates a route and a running plan according to which the vehicle runs when the vehicle is moved to a target parking position. Further, the control-command-value generating device 198 generates, based on the running plan, a control command value such as a request for the operation of the hydraulic brakes 12, 14 (including a request for initiation of the operation) and a target deceleration and supplies the generated control command value to the brake control device 200. Based on the recognized image, the control-command-value generating device 198 obtains a distance D between: a three-dimensional object or a human present in surroundings of an own vehicle (as the vehicle on which the present brake system is installed); and the own vehicle. A three-dimensional object, a human, etc., will be collectively referred to as an "object" where appropriate. Based on the obtained distance D, a speed at which the own vehicle and the object approach each other (hereinafter referred to as "approach speed" where appropriate), the temperature of the working fluid obtained based on the detection value of the temperature sensor 216, etc., the control-command-value generating device 198 obtains an operation timing of the hydraulic brakes 12, 14 and creates or modifies the running plan.

The brake control device 200 controls the upstream hydraulic-pressure control mechanism 34, the downstream hydraulic-pressure control mechanism 33, the EPBACT 188, etc., based on the control command value (such as the request for the operation of the hydraulic brakes 12, 14 and the target deceleration) supplied from the control-command-value generating device 198. For instance, the brake control device 200 obtains a total target hydraulic pressure that is a target value of the hydraulic pressure of the hydraulic brakes 12, 14 and that corresponds to the target deceleration. The brake control device 200 controls the supply current to each of the pressure-increase control valve 94, the pressure-decrease control valve 96, and the hydraulic pressure control valves 160, etc., such that an actual hydraulic pressure in the hydraulic brakes 12, 14 becomes close to the total target hydraulic pressure. Further, when the own vehicle reaches the target parking position, the brake control device 200 controls the EPBACT 188 to operate the parking brakes.

The controller 20 includes not only the brake control device 200 but also a hybrid vehicle/electronic fuel injection (HV/EFI) control device, an electronic controlled power steer (EPS) control device, a shift by wire (SBW) control device, etc., and controls an HV/EFI actuator, an EPS actuator, an SBW actuator, etc. However, a control of the HV/EFI actuator, the EPS actuator, the SBW actuator, etc., is not relevant to the present disclosure, and an explanation thereof is dispensed with.

There will be next explained operations of the thus configured brake system in a case where the remote parking control is executed.

In the remote parking control, the brake control device 200 obtains the total target hydraulic pressure corresponding to the target deceleration that is the control command value generated by the control-command-value generating device 198 and controls the upstream hydraulic-pressure control mechanism 34 such that the actual hydraulic pressure of the hydraulic brakes 12, 14 becomes close to the total target hydraulic pressure. That is, when the upstream hydraulic-pressure control mechanism 34 is not in an abnormal state, the hydraulic pressure is generated in the hydraulic brakes 12, 14 by the operation of the upstream hydraulic-pressure control mechanism 34, so that the own vehicle is decelerated.

The regulator 45 in the upstream hydraulic-pressure control mechanism 34 is operated, the hydraulic pressure in the rear chamber 44 is controlled, and the hydraulic pressure in the pressurizing chambers 46, 47 is controlled.

In the rear-hydraulic-pressure control device 48, the hydraulic pressure in the control chamber 122 is controlled by controlling the pressure-increase control valve 94 and the pressure-decrease control valve 96. The control piston 114 is moved forward, and the servo pressure is generated in the servo chamber 124. The generated servo pressure is supplied to the rear chamber 44. The pressurizing piston 41 is moved forward by the hydraulic pressure in the rear chamber 44, and the pressurizing piston 42 is moved forward. Thus, the hydraulic pressure is generated in the pressurizing chambers 46, 47. When the pressurizing chambers 46, 47 and the wheel cylinders 36, 38 are held in communication with each other, the hydraulic pressure in the pressurizing chambers 46, 47 is supplied to the corresponding wheel cylinders 36, 38, so that the hydraulic brakes 12, 14 are operated. The hydraulic pressure in the wheel cylinders 36, 38 is substantially the same as the hydraulic pressure in the pressurizing chambers 46, 47.

Figure 8:
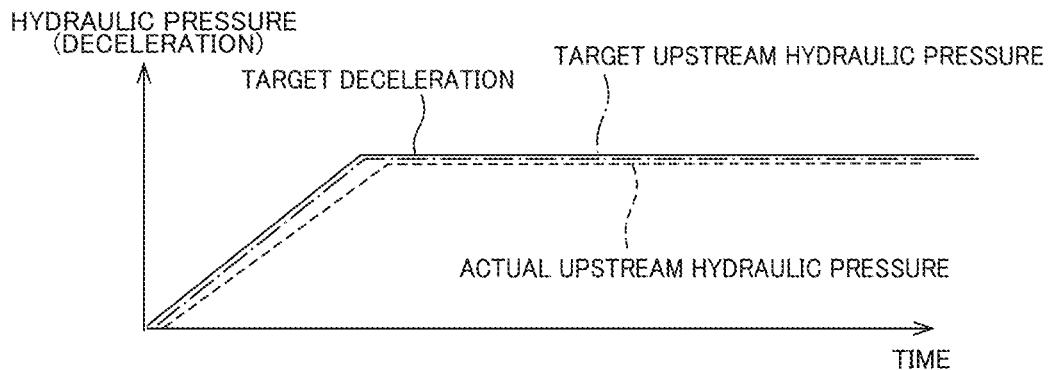
FIG. 8 is a conceptual view illustrating a state of a braking-force control when an upstream hydraulic-pressure control mechanism of the brake system is normal.

In the present embodiment, as illustrated in FIG. 8, the pressure-increase control valve 94 and the pressure-decrease control valve 96 are controlled such that an actual hydraulic pressure, which is the hydraulic pressure in the pressurizing chamber 46 detected by the master cylinder pressure sensor 190, becomes close to a target upstream hydraulic pressure that is the total target hydraulic pressure. The above-indicated actual hydraulic pressure may be referred to as a first actual hydraulic pressure or an actual upstream hydraulic pressure.

In the brake control device 200, it is detected whether the upstream hydraulic-pressure control mechanism 34 is in the abnormal state. In the brake control device 200 of the present embodiment, the detection value of the master cylinder pressure sensor 190 is obtained at intervals of a cycle time, and the actual upstream hydraulic pressure is obtained. A difference between the actual upstream hydraulic pressure and the target upstream hydraulic pressure is obtained at intervals of the cycle time, and it is determined whether the difference is greater than an abnormality determination threshold. For accurately detecting whether the upstream hydraulic-pressure control mechanism 34 is in a first abnormal state (as the abnormal state), a monitoring time (i.e., a time during which monitoring for the actual upstream hydraulic pressure is performed) is increased. In particular, in a case where unattended driving is performed such as when the remote parking control is executed, it is highly needed to detect, with high accuracy, the presence or absence of the abnormality of the vehicle brake system.

In the meantime, when the temperature of the working fluid is low and the viscosity of the working fluid is high, actuation of the rear-hydraulic-pressure control device 48 may be delayed, causing a delay in an increase of the hydraulic pressure in the pressurizing chambers 46, 47. In this case, the upstream hydraulic-pressure control mechanism 34 may be erroneously detected to be in the first abnormal state even if it is actually normal. For preventing such erroneous detection, the monitoring time is made longer when the temperature of the working fluid is lower than a first set temperature than when the temperature of the working fluid is not lower than the first set temperature (including a case in which the temperature of the working fluid is equal to the normal temperature). The first set temperature may be a temperature at which it is estimated that the viscosity of the working fluid is high and the delay in the actuation is caused.

In the present embodiment, the monitoring time is set to a first set time when the temperature of the working fluid is not lower than the first set temperature, and the monitoring time is set to a second set time when the temperature of the working fluid is lower than the first set temperature, the second set time being longer than the first set time.

When the temperature of the working fluid is not lower than the first set temperature, the detection value of the master cylinder pressure sensor 190 is obtained for the first set time at intervals of the cycle time, and it is determined whether the difference between the actual upstream hydraulic pressure and the target upstream hydraulic pressure is greater than the abnormality determination threshold. The upstream hydraulic-pressure control mechanism 34 may be detected to be in the first abnormal state when at least one of the following conditions is satisfied: (i) a condition that the number of times in which the difference has been determined to be greater than the abnormality determination threshold $6s$ is greater than or equal to a first abnormality-determination number; (ii) a condition that a representative value is greater than the abnormality determination threshold $6s$, the representative value being a value obtained by statistically processing a plurality of differences obtained for the first set time at intervals of the cycle time; and (iii) a condition that the difference is greater than the abnormality determination threshold $6s$ at a time point when the first set time elapses. The abnormality determination threshold $6s$ may be determined based on a certain magnitude of the difference that is less likely to be generated when the upstream hydraulic-pressure control mechanism 34 is normal.

When the temperature of the working fluid is lower than the first set temperature, the detection value of the master cylinder pressure sensor 190 is obtained for the second set time at intervals of the cycle time, and it is determined whether the difference is greater than the abnormality determination threshold $6s$. The upstream hydraulic-pressure control mechanism 34 may be determined to be in the first abnormal state when at least one of the following conditions is satisfied: (i) a condition that the number of times in which the difference has been determined to be greater than the abnormality determination threshold $6s$ is greater than or equal to a second abnormality-determination number that is greater than the first abnormality-determination number; (ii) a condition that the representative value is greater than the abnormality determination threshold $6s$, the representative value being a value obtained by statistically processing the plurality of differences obtained for the second set time at intervals of the cycle time; and (iii) a condition that the difference is greater than the abnormality determination threshold $6s$ at a time point when the second set time elapses.

Figure 7:
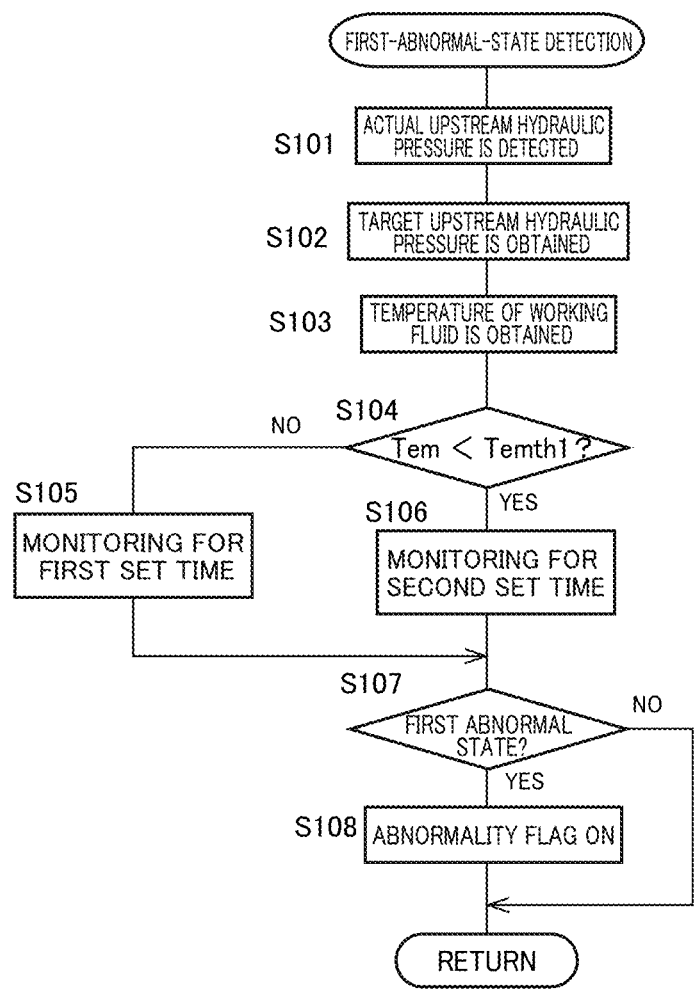
FIG. 7 is a flowchart representing a first-abnormal-state detecting program stored in the memory.

A first-abnormal-state detecting program of FIG. 7 is executed by the controller 20 (the brake control device 200) at intervals of the predetermined cycle time.

At Step 101, the actual upstream hydraulic pressure, which is the detection value of the master cylinder pressure sensor 190, is obtained. (Step 101 is abbreviated as S101. Other steps are similarly abbreviated.) At S102, the target upstream hydraulic pressure is obtained. The target upstream hydraulic pressure is the total target hydraulic pressure. At S103, the temperature of the working fluid is obtained based on the detection value of the temperature sensor 216. At S104, it is determined whether the temperature of the working fluid is lower than a first set temperature Temth1. When the temperature of the working fluid is not lower than the first set temperature, the control flow proceeds to S105 at which monitoring for the actual upstream hydraulic-pressure is performed for the first set time. When the temperature of the working fluid is lower than the first set temperature, the control flow proceeds to S106 at which the monitoring is performed for the second set time. At S107, it is determined whether the upstream hydraulic-pressure control mechanism 34 has been detected to be in the first abnormal state. When an affirmative determination (YES) is made at S107, an abnormality flag is set to ON at S108.

Figure 11:
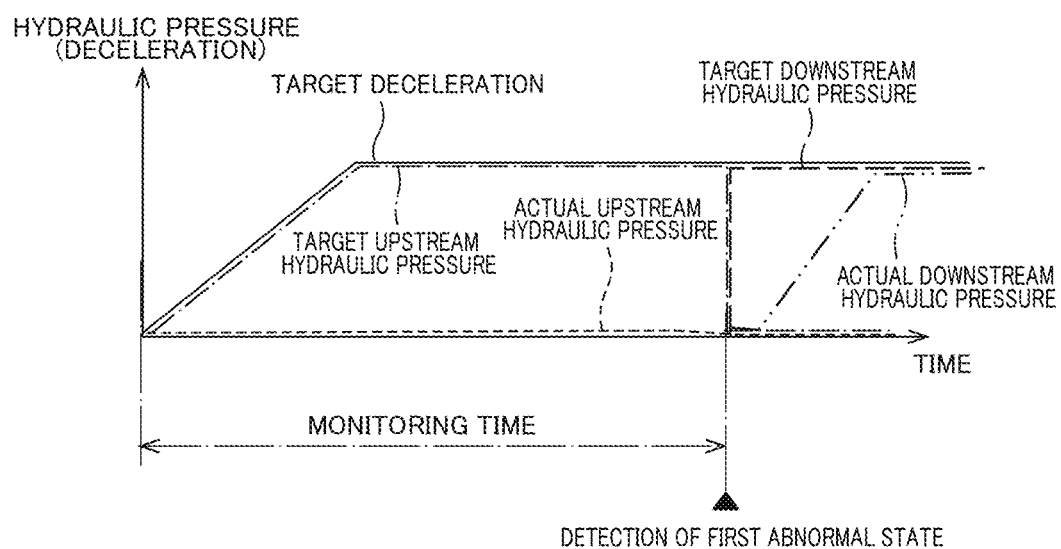
FIG. 11 is a conceptual view illustrating a state of the braking-force control in a case where the upstream hydraulic-pressure control mechanism is in the first abnormal state in a conventional vehicle brake system.

When the abnormality flag is set to ON, the remote parking control is suspended, the upstream hydraulic-pressure control mechanism 34 stops operating, and the downstream hydraulic-pressure control mechanism 33 is operated, as illustrated in FIG. 11.

In the downstream hydraulic-pressure control mechanism 33, the pump device 158 is operated, and the hydraulic pressure in the wheel cylinders 36, 38 is controlled by the hydraulic pressure control valves 160.

The hydraulic pressure on the downstream side of the hydraulic pressure control valves 160 corresponds to the hydraulic pressure in the wheel cylinders 36, 38, and the hydraulic pressure on the upstream side of the hydraulic pressure control valves 160 corresponds to the hydraulic pressure in the pressurizing chambers 46, 47. By controlling the supply current to the hydraulic pressure control valves 160, the pressure difference between the hydraulic pressure on the upstream side and the hydraulic pressure on the downstream side is controlled, so that the hydraulic pressure in the wheel cylinders 36, 38 is made higher than the hydraulic pressure in the pressurizing chambers 46, 47.

The pressure difference, which is obtained by subtracting the detection values of the wheel cylinder pressure sensors 192 from the detection value of the master cylinder pressure sensor 190, is determined to be an actual downstream hydraulic pressure. The supply current to the hydraulic pressure control valves 160 is controlled in the operating state of the pump device 158 such that the actual downstream hydraulic pressure becomes close to the target downstream hydraulic pressure obtained based on the total target hydraulic pressure. In a stopped state of the upstream hydraulic-pressure control mechanism 34, the actual downstream hydraulic pressure that corresponds to the pressure difference is substantially the same as the hydraulic pressure in the wheel cylinders 36, 38, and the total target hydraulic pressure is determined to be the target downstream hydraulic pressure.

It takes, however, a long time for detecting whether the upstream hydraulic-pressure control mechanism 34 is in the first abnormal state. This may cause in some cases a shortage of the braking force till a time point when the upstream hydraulic-pressure control mechanism 34 is detected to be in the first abnormal state.

On the other hand, if the downstream hydraulic-pressure control mechanism 33 is excessively or unnecessarily operated before it is detected whether the upstream hydraulic-pressure control mechanism 34 is in the first abnormal state, the working fluid ejected from the pump device 158 may be supplied to the fluid passage 54, and the detection value of the master cylinder pressure sensor 190 may sometimes vary. In this case, it is difficult to detect, with high accuracy, whether the upstream hydraulic-pressure control mechanism 34 is abnormal.

In view of the above, in a period before it is detected whether the upstream hydraulic-pressure control mechanism 34 is in the first abnormal state, the downstream hydraulic-pressure control mechanism 33 is operated later when the temperature of the working fluid is low than when the temperature of the working fluid is high, to assist the braking force. In other words, the downstream hydraulic-pressure control mechanism 33 is operated after a lapse of an assist wait time from a time point of detection that the upstream hydraulic-pressure control mechanism 34 has reached the second abnormal state, the second abnormal state being a state that the upstream hydraulic-pressure control mechanism 34 reaches before reaching the first abnormal state. Further, the assist wait time is made longer when the temperature of the working fluid is low than when the temperature of the working fluid is high.

Figure 3:
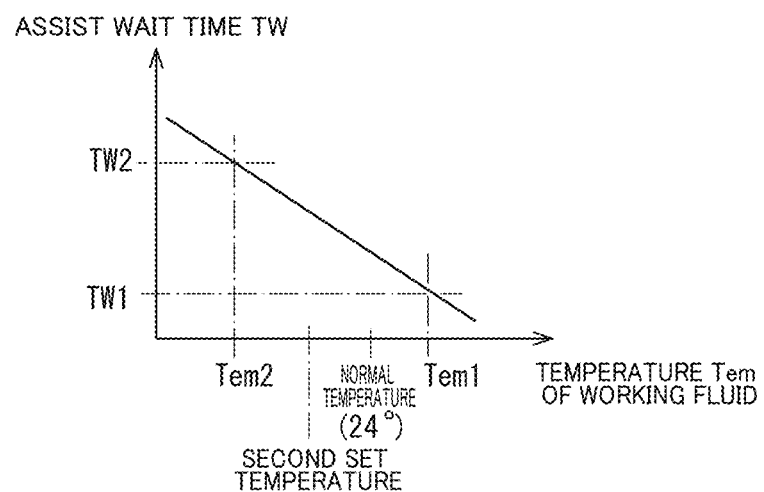
FIG. 3 is a conceptual view illustrating an assist-wait-time determination map stored in a memory of the controller in the brake system.

In the present embodiment, the memory of the controller 20 stores an assist-wait-time determination map. As illustrated in FIG. 3, the assist wait time is shorter when the temperature of the working fluid is high than when the temperature of the working fluid is low. (The assist wait time is shorter when the temperature of the working fluid is not lower than a second set temperature as a predetermined temperature than when the temperature of the working fluid is lower than the second set temperature.) For instance, the assist wait time may be made shorter continuously or in steps with an increase in the temperature. The assist-wait-time determination map may be obtained in advance by simulations, experiments, etc., or may be theoretically obtained in advance.

Though the second set temperature is illustrated in FIG. 3 as a temperature lower than the normal temperature, the second set temperature may be a temperature higher than or equal to the normal temperature.

The second abnormal state of the upstream hydraulic-pressure control mechanism 34 is a state prior to detection that the upstream hydraulic-pressure control mechanism 34 is in the first abnormal state. For instance, the monitoring time when detecting whether the upstream hydraulic-pressure control mechanism 34 is in the second abnormal state may be set to a third set time that is shorter than the first set time. When it is detected that the difference is greater than the abnormality determination threshold $6s$ as a result of the monitoring performed for the third set time, the upstream hydraulic-pressure control mechanism 34 may be detected to be in the second abnormal state. The third set time may be set as a length of time that is considerably shorter than the first set time.

Even when the upstream hydraulic-pressure control mechanism 34 is detected to be in the second abnormal state, the downstream hydraulic-pressure control mechanism 33 is not immediately operated. Accordingly, the braking force is sometimes insufficient in the remote parking control. Here, a case is considered in which a relationship between: the distance D between the object (such as a wall) present in the surroundings of the own vehicle and the own vehicle; and the running speed V of the own vehicle is a relationship in which the distance D is shorter or the running speed V is higher than a map representing a brake operation timing. In this case, the request for the operation of the hydraulic brakes 12, 14 is made in the remote parking control. The map that represents the brake operation timing is set so as to have a relationship in which the distance D is longer and the running speed V is lower when the temperature of the working fluid is low than when the temperature of the working fluid is high.

Figure 4:
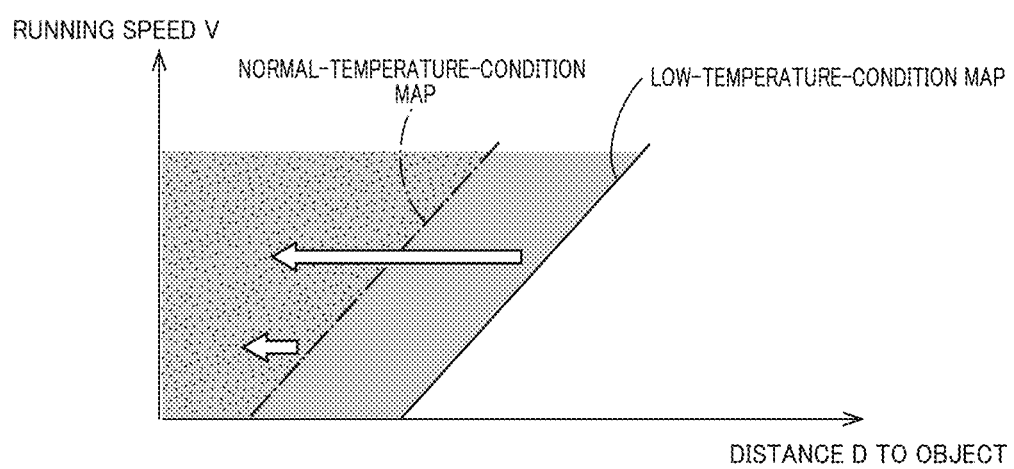
FIG. 4 is a conceptual view illustrating a brake-operation-timing determination map stored in the memory.

In the present embodiment, a brake-operation-timing determination map illustrated in FIG. 4 is stored. The brake-operation-timing determination map is set such that the operation timing is earlier when the temperature of the working fluid is lower than a third set temperature Temth3 than when the temperature of the working fluid is not lower than the third set temperature Temth3. When the temperature of the working fluid is not lower than the third set temperature, a normal-temperature-condition map indicated by the long dashed short dashed line is selected as the brake-operation-timing determination map, and the request for the operation of the hydraulic brakes 12, 14 is made in a case where the running speed V and the distance D fall within a dotted region in FIG. 4. (In a case where the object is a human or a three-dimensional object, the speed at which the own vehicle and the object approach each other may be considered as being substantially equal to the running speed of the own vehicle.) When the temperature of the working fluid is lower than the third set temperature, the low-temperature-condition map indicated by the solid line is selected as the brake-operation-timing determination map, and the request for the operation of the hydraulic brakes 12, 14 is made in a case where the running speed V and the distance D fall within a shaded region in FIG. 4.

As apparent from the low-temperature-condition map indicated by the solid line and the normal-temperature-condition map indicated by the long dashed short dashed line, the request for the operation of the hydraulic brakes 12, 14 is made at earlier timing when the temperature of the working fluid is low, as compared with when the temperature of the working fluid is high, and the request for the operation of the hydraulic brakes 12, 14 is made even if the running speed V is low and the distance D is large.

The third set temperature may be substantially the same as or different from the first set temperature or the second set temperature. Further, the first set temperature and the second set temperature may be substantially the same or different from each other.

Figure 5:
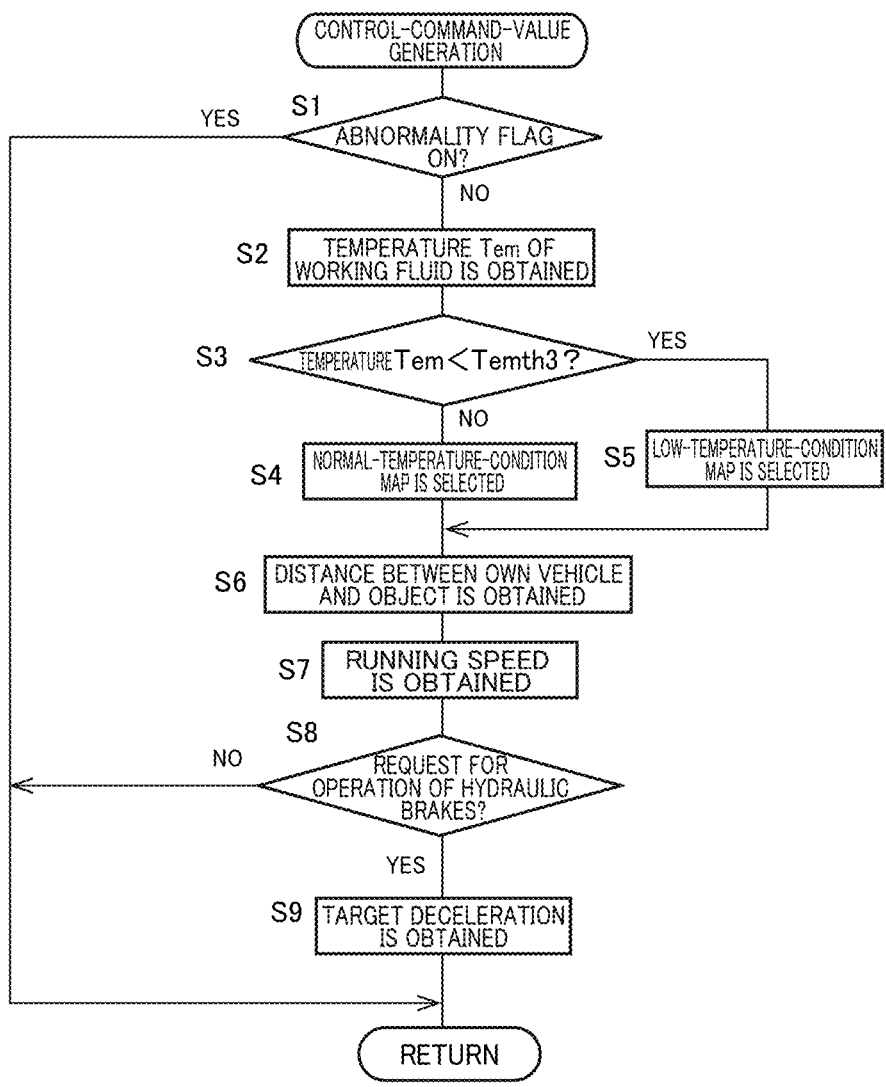
FIG. 5 is a flowchart representing a control-command-value generating program stored in the memory.

The controller 20 executes a control-command-value generating program represented by a flowchart of FIG. 5 at intervals of the predetermined cycle time.

At S1, it is determined whether the abnormality flag is ON. When a negative determination (NO) is made at S1, S2 is implemented to obtain the temperature of the working fluid based on the detection value of the temperature sensor 216. At S3, it is determined whether the temperature Tem of the working fluid is lower than the third set temperature Temth3.

When a negative determination (NO) is made at S3, S4 is implemented to select the normal-temperature-condition map indicated by the long dashed short dashed line in FIG. 4. When an affirmative determination (YES) is made at S3, S5 is implemented to select the low-temperature-condition map indicated by the solid line in FIG. 4.

At S6, the distance D between the own vehicle and the object is obtained. At S7, the running speed V of the own vehicle is obtained based on the detection values of the wheel speed sensors 194, etc.

At S8, it is determined whether the distance D and the running speed V fall within a region in which the distance D is smaller or the running speed V is higher than those represented by the selected brake-operation-timing determination map, namely, it is determined whether the request for the operation of the hydraulic brakes 12, 14 is made. When an affirmative determination (YES) is made at S8, the control flow proceeds to S9 at which the target deceleration as the control command value is generated. When a negative determination (NO) is made at S8, S9 is not implemented.

When an affirmative determination (YES) is made at S1, S2 and subsequent steps are not implemented because the remote parking control is not executed.

Figure 6:
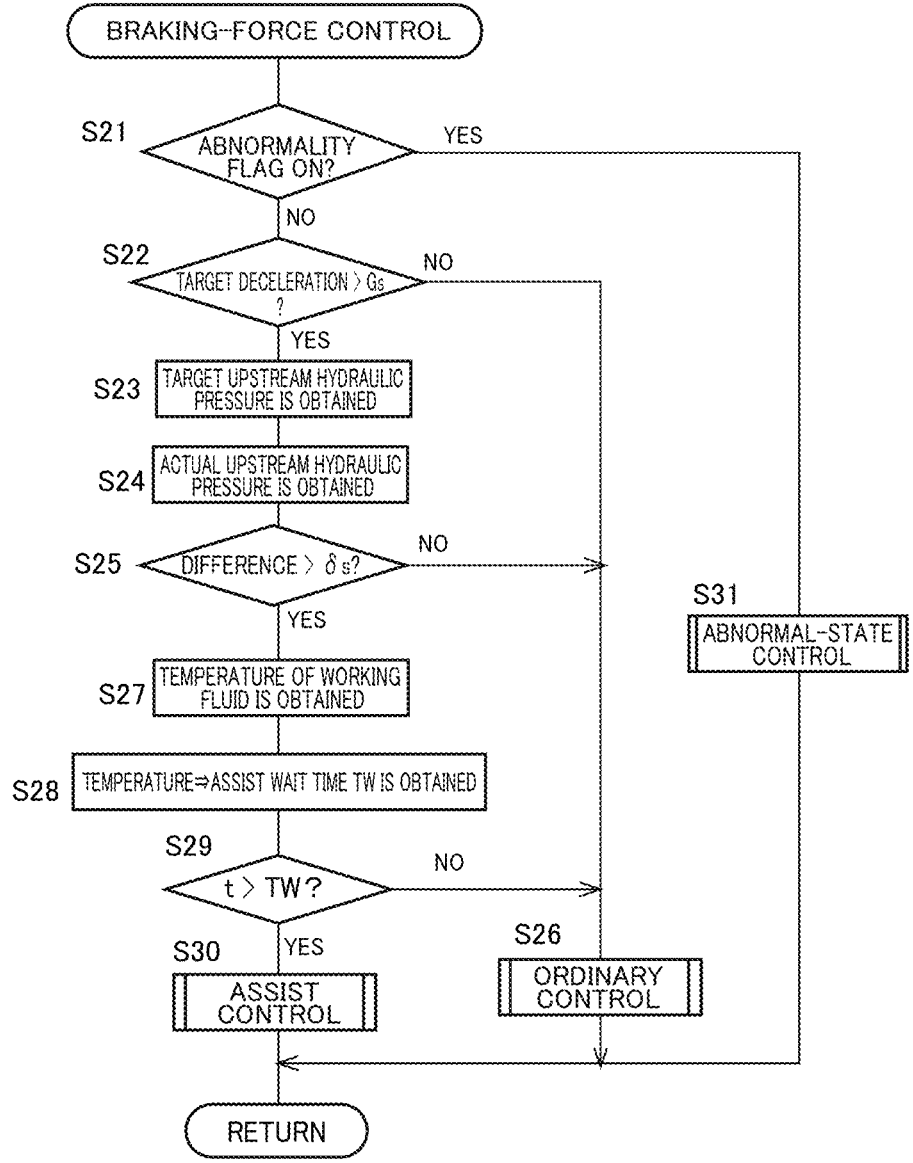
FIG. 6 is a flowchart representing a braking-force control program stored in the memory.

The brake control device 200 of the controller 20 executes a braking-force control program represented by a flowchart of FIG. 6.

At S21, it is determined whether the abnormality flag is ON. When a negative determination (NO) is made at S21, S22 is implemented to determine whether the target deceleration is greater than a set deceleration Gs. The set deceleration Gs has a magnitude at which it is considered that there is a risk of a shortage of the braking force. For instance, the set deceleration Gs may have a magnitude at which it is considered that the assist control should be executed in a case where the braking force generated by the upstream hydraulic-pressure control mechanism 34 is small. Further, the set deceleration Gs may have a magnitude that enables the presence of the request for the operation of the hydraulic brakes 12, 14 to be surely recognized. At S23, the target upstream hydraulic pressure is obtained based on the target deceleration. At S24, the actual upstream hydraulic pressure that is the detection value of the master cylinder pressure sensor 190 is obtained. At S25, it is determined whether the difference is greater than the abnormality determination threshold 6s.

When a negative determination (NO) is made at S22 or S25, the control flow proceeds to S26 at which an ordinary control is executed. In a case where the upstream hydraulic-pressure control mechanism 34 is not detected to be in the first abnormal state and the second abnormal state or in a case where the target deceleration is less than the set deceleration Gs, the upstream hydraulic-pressure control mechanism 34 is controlled to attain the target deceleration in the remote parking control.

When an affirmative determination (YES) is made at S25, the upstream hydraulic-pressure control mechanism 34 is detected to be in the second abnormal state. In the present embodiment, the upstream hydraulic-pressure control mechanism 34 is detected to be in the second abnormal state when it is determined once or more than once that the abnormality flag is OFF and the difference is not less than the abnormality determination threshold 6s. In other words, a length of time, during which the difference is obtained and it is determined once or more than once that the difference is not less than the abnormality determination threshold 6s, is considered as the third set time.

At S27, the temperature of the working fluid is obtained based on the detection value of the temperature sensor 216. At S28, the assist wait time TW is determined according to the map of FIG. 3. When the temperature of the working fluid is a temperature Tem1 that is not lower than the second set temperature, the assist wait time TW is determined to be an assist wait time TW1. When the temperature of the working fluid is a temperature Tem2 that is lower than the second set temperature, the assist wait time TW is determined to be an assist wait time TW2. At S29, it is determined whether an elapsed time t, which is a time elapsed after an affirmative determination (YES) is made at S25 for the first time, reaches the assist wait time TW. When an affirmative determination (YES) is made at S29, the control flow proceeds to S30 at which the assist control is executed. When a negative determination (NO) is made at S29, the control flow proceeds to S26 at which the ordinary control is executed. It is noted that an abnormal-state control is executed at S31 when an affirmative determination (YES) is made at S21.

The target upstream hydraulic pressure may be taken into consideration in determining the assist wait time TW at S28. For instance, the assist wait time TW may be determined to be shorter when the target upstream hydraulic pressure is high than when the target upstream hydraulic pressure is low in a case where the temperature of the working fluid is the same.

One example of the ordinary control at S26 is illustrated in FIG. 8. In the ordinary control, the pressure-increase control valve 94 and the pressure-decrease control valve 96 are controlled such that the actual upstream hydraulic pressure, which is the detection value of the master cylinder pressure sensor 190, becomes close to the target upstream hydraulic pressure (corresponding to the total target hydraulic pressure). The ordinary control is executed when the upstream hydraulic-pressure control mechanism 34 is detected to be in the second abnormal state and before the assist wait time elapses. In the present embodiment, however, because the operation timing of the hydraulic brakes 12, 14 is obtained based on the brake-operation-timing determination map (FIG. 4) determined based on the temperature of the working fluid, the shortage of the braking force in the remote parking control is prevented or reduced.

In the assist control at S30, a cooperative control by the upstream hydraulic-pressure control mechanism 34 and the downstream hydraulic-pressure control mechanism 33 is executed. The target downstream hydraulic pressure is obtained based on a value obtained by subtracting the actual upstream hydraulic pressure from the total target hydraulic pressure. The pump motor 156 is operated and the hydraulic pressure control valves 160 are controlled such that the pressure difference between a wheel cylinder pressure detected by the wheel cylinder pressure sensors 192 and a master cylinder pressure detected by the master cylinder pressure sensor 190, i.e., the actual downstream hydraulic pressure, becomes close to the target downstream hydraulic pressure.

Figure 9:
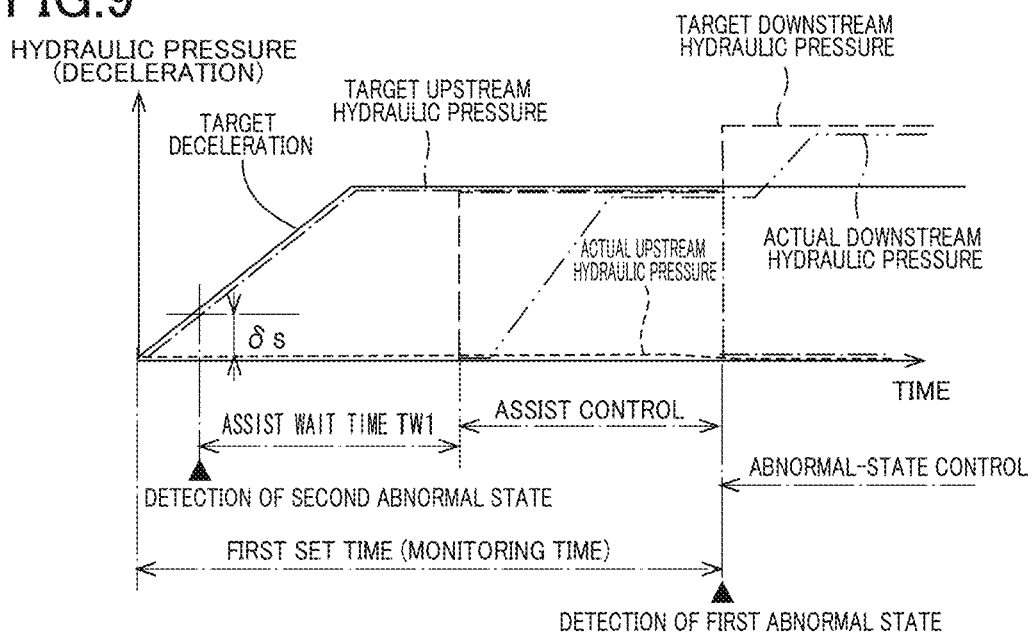
FIG. 9 is a conceptual view illustrating a state of the braking-force control when the upstream hydraulic-pressure mechanism is detected to in a first abnormal state after an assist control has been executed in the brake system.

In a case where the temperature of the working fluid is the temperature Tem1 that is not lower than the first set temperature as illustrated in FIG. 9, an affirmative determination (YES) is made at S29 after a lapse of the assist wait time TW1 from a time point of detection that the upstream hydraulic-pressure control mechanism 34 is in the second abnormal state, and the assist control is executed at S30. It is determined whether the upstream hydraulic-pressure control mechanism 34 is in the first abnormal state after a lapse of the first set time. In a case where the upstream hydraulic-pressure control mechanism 34 is detected to be in the first abnormal state, an affirmative determination (YES) is made at S21, and the abnormal-state control is executed at S31. In the abnormal-state control, the target downstream hydraulic pressure that is the total target hydraulic pressure is determined to be the abnormal-state target hydraulic pressure irrespective of the target deceleration for the remote parking control determined by the control-command-value generating device 198, and the downstream hydraulic-pressure control mechanism 33 is controlled. The hydraulic pressure control valves 160 are controlled such that the actual downstream hydraulic pressure becomes close to the abnormal-state target hydraulic pressure that is the target downstream hydraulic pressure. Because the upstream hydraulic-pressure control mechanism 34 is in a stopped state, the detection value of the master cylinder pressure sensor 190 is small, and the actual downstream hydraulic pressure is considered as being substantially equal to the hydraulic pressure in the wheel cylinders 36, 38.

The abnormal-state target hydraulic pressure is a pressure level at which the abnormal-state target braking force and the abnormal-state target deceleration are attained. In other words, the actual downstream hydraulic pressure is controlled so as to become close to the abnormal-state target hydraulic pressure, so that the abnormal-state target braking force is applied to the vehicle in principle, and the deceleration of the vehicle is brought close to the abnormal-state target deceleration.

Figure 10:
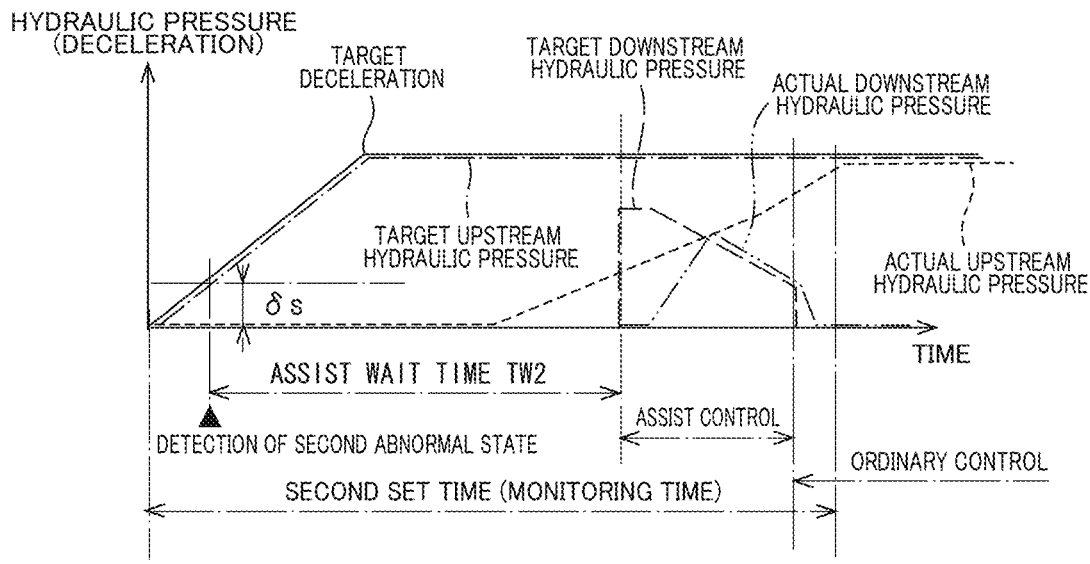
FIG. 10 is a conceptual view illustrating a state of the braking-force control in a case where the assist control is executed in a low temperature condition in the brake system.

In a case where the temperature of the working fluid is the temperature Tem2 that is lower than the first set temperature as illustrated in FIG. 10, the assist wait time is determined to be the assist wait time TW2. After a lapse of the assist wait time TW2 from a time point of detection that the upstream hydraulic-pressure control mechanism 34 is in the second abnormal state, the assist control is executed at S30. In a case where the actual upstream hydraulic pressure is increased and the difference between the actual upstream hydraulic pressure and the target upstream hydraulic pressure becomes less than the abnormality determination threshold $6s$, the ordinary control is executed even before the second set time elapses.

In the present embodiment, timing at which the downstream hydraulic-pressure control mechanism 33 starts assisting the braking force (i.e., assist timing) is later when the temperature of the working fluid is low than when the temperature of the working fluid is high. This configuration prevents or reduces a decrease in the accuracy of detecting whether the upstream hydraulic-pressure control mechanism 34 is in the first abnormal state even in a case where the temperature of the working fluid is low and the delay in actuation of the upstream hydraulic-pressure control mechanism 34 is caused. In the remote parking control, the hydraulic brakes 12, 14 are operated more readily when the temperature of the working fluid is low than when the temperature of the working fluid is high. This configuration obviates disadvantages in the remote parking control that arise from a delay in the assist timing, improving safety in the remote parking control.

In the present embodiment, the first-abnormal-state detecting device includes, for instance, portions of the controller 20 that store and execute the first-abnormal-state detecting program. The second-abnormal-state detecting device includes, for instance, portions of the controller 20 that store and execute S23-S25 of the hydraulic pressure control program. The first-actual-hydraulic-pressure obtaining device includes, for instance, the master cylinder pressure sensor 190 and portions of the controller 20 that store and execute S101, S24. The assist-wait-time determining device incudes, for instance, a portion of the controller 20 that store the map of FIG. 3 and portions of the controller 20 that store and execute S27, S28. The assist control device includes, for instance, portions of the controller that store and execute S30. The abnormal-state control device includes, for instance, portions of the controller that store and execute S31. The control-command-value generating device includes, for instance, portions of the controller that store and execute the control-command-value generating program. The brake control device includes, for instance, portions of the controller 20 that store and execute the braking-force control program. The first actual hydraulic pressure corresponds to the actual upstream hydraulic pressure, and the first target hydraulic pressure corresponds to the target upstream hydraulic pressure.

In the embodiment illustrated above, the control of the hydraulic pressure in the hydraulic brakes 12, 14 in the remote parking control has been explained. The control of the hydraulic pressure in the hydraulic brakes 12, 14 described above is widely applicable to a case in which automatic braking is performed, in addition to the case in which the remote parking control is executed.

The controller 20 may have any suitable configuration. The controller 20 may include a plurality of ECUs or may include a single ECU. One example of an arrangement in which the controller 20 includes a plurality of ECUs will be explained referring to FIG. 12. It is noted that the same reference signs as used in FIG. 1 are used to identify the corresponding constituent elements in FIG. 12, and an explanation thereof is dispensed with.

Figure 12:
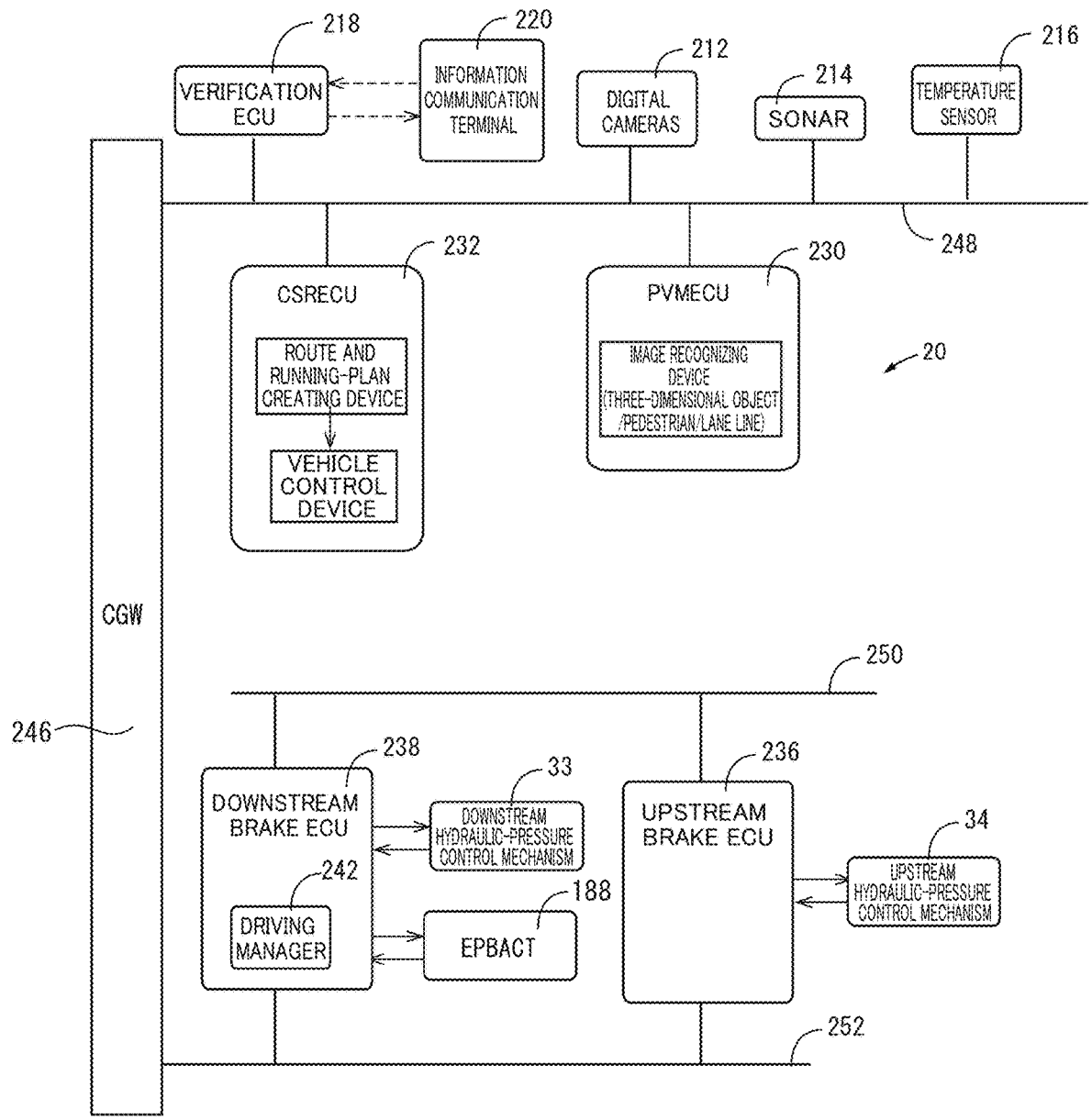
FIG. 12 is a conceptual view illustrating one example of a detailed configuration of the controller.

As illustrated in FIG. 12, the controller 20 is constituted by a plurality of ECUs 230, 232, 236, 238, etc., each of which is constituted principally by a computer. The plurality of ECUs 230-238 are communicably connected to one another via a central gate way (CGW) 246, buses 248-252, etc. The digital cameras 212, the sonar 214, the temperature sensor 216 are connected to the bus 248. Image information obtained by the digital cameras 212, information obtained by the sonar 214, the temperature detected by the temperature sensor 216 are suppliable to the plurality of ECUs 230, 232, 236, 238 etc.

The ECU 230 is a panoramic view monitor (PVM) ECU 230. The PVM ECU 230 includes an image recognizing device that recognizes a three-dimensional object, a human, a lane line etc., in the surroundings of the vehicle. The PVM ECU 230 forms a panoramic image based on images taken by the plurality of digital cameras 212, for instance.

The ECU 232 is a clearance sonar (CSR) ECU 232. The CSR ECU 232 includes a route and running-plan creating device, a vehicle control device, etc. The route and running-plan creating device performs image recognition based on information representative of the panoramic image supplied from the PVM ECU 230, information from the sonar 214, etc. The route and running-plan creating device creates an overhead view image and creates a route and a running plan according to which the vehicle is moved to the target parking position. Based on the route and the running plan created by the route and running-plan creating device, for instance, the vehicle control device generates a control command value for the brake system and outputs the generated control command value to a driving manager 242. Based on the overhead view image, the route and running-plan generating device obtains the distance D between the own vehicle and the object present in the surroundings of the own vehicle such as a three-dimensional object or a human. The route and running-plan generating device may create the running plan by obtaining the operation timing of the hydraulic brakes 12, 14 based on the obtained distance D and the temperature of the working fluid obtained based on the detection value of the temperature sensor 216, for instance.

The ECU 236 is an upstream brake ECU 236. The upstream hydraulic-pressure control mechanism 34 is connected to the upstream brake ECU 236. The upstream hydraulic-pressure control mechanism 34 supplies, to the upstream brake ECU 236, the detection values of the sensors such as the servo pressure sensor 132 included in the upstream hydraulic-pressure control mechanism 34. The upstream brake ECU 236 outputs, to the upstream hydraulic-pressure control mechanism 34, the control command value for the pump motor 88 and the solenoids of the electromagnetic valves such as the pressure-increase control valve 94 and the pressure-decrease control valve 96.

The ECU 238 is a downstream brake ECU 238. The downstream hydraulic-pressure control mechanism 33 is connected to the downstream brake ECU 238. The downstream hydraulic-pressure control mechanism 33 supplies, to the downstream brake ECU 238, the detection values of the plurality of sensors such as the master cylinder pressure sensor 190 included in the downstream hydraulic-pressure control mechanism 33. The downstream brake ECU 238 outputs, to the downstream hydraulic-pressure control mechanism 33, the control command value for the pump motor 156, the solenoids of the electromagnetic valves such as the hydraulic pressure control valves 160 and the pressure-hold valves 170, and the parking brake actuator 188. Though the driving manager 242 is included in the downstream brake ECU 238, the driving manager 242 controls the downstream hydraulic-pressure control mechanism 33 based on the control command value supplied from the vehicle control device of the CSR ECU 232 and supplies the control command value to the upstream brake ECU 236. The control command value is supplied also to the HV/EFI control device and the EPS control device. The upstream brake ECU 236 controls the upstream hydraulic-pressure control mechanism 34 based on the control command value.

The programs described above may be executed by any of the plurality of ECUs of the controller 20. For instance, the first-abnormal-state detecting program of FIG. 7 and the braking-force control program of FIG. 6 may be executed by at least one of the upstream brake ECU 236 and the downstream brake ECU 238. The control-command-value generating program of FIG. 5 may be executed by at least one of the CSR ECU 232 and the downstream brake ECU 202.

The temperature sensor 216 may include at least one of a temperature sensor used in the CSR ECU232 and a temperature sensor used in the downstream brake ECU 238.

The present disclosure is applicable to hybrid vehicles, battery electric vehicles, engine-driven vehicles, etc. A parking lock mechanism may be operated instead of operating parking brakes when the vehicle stops. In this case, the upstream brake ECU 236 supplies a parking lock command to an SBW ECU (SBW control device) not illustrated.

It is to be understood that the present disclosure is not limited to the details of the illustrated embodiment, but may be embodied with various changes and modifications, which may occur to those skilled in the art, without departing from the spirit and the scope of the disclosure. For instance, the brake circuit may have any configuration.

Claimable Invention (1) A brake system for a vehicle, comprising:
  a first hydraulic-pressure control mechanism configured to control a hydraulic pressure in a plurality of hydraulic brakes respectively provided for a plurality of wheels of the vehicle to thereby control a braking force to be applied to the vehicle;
  a second braking-force control mechanism configured to control the braking force, the second braking-force control mechanism being different from the first hydraulic-pressure control mechanism; and
  a controller including a first-abnormal-state detecting device configured to
  detect whether the first hydraulic-pressure control mechanism is in a first abnormal state
  as an abnormal state,
  wherein the controller is configured to:
    control the first hydraulic-pressure control mechanism so as to control the braking force when the first-abnormal-state detecting device does not detect that the first hydraulic-pressure control mechanism is in the first abnormal state; and control not the first hydraulic-pressure control mechanism but the second braking-force control mechanism so as to control the braking force when the first-abnormal-state detecting device detects that the first hydraulic-pressure control mechanism is in the first abnormal state, wherein the brake system comprises a temperature obtaining device configured to obtain a temperature of a working fluid in the brake system, wherein the controller includes:

a second-abnormal-state detecting device configured to detect whether the first hydraulic-pressure control mechanism is in a second abnormal state, the second abnormal state being a state that the first hydraulic-pressure control mechanism reaches before reaching the first abnormal state; and an assist control device configured to control the second braking-force control mechanism so as to control the braking force when an assist wait time elapses after the second-abnormal-state detecting device has detected that the first hydraulic-pressure control mechanism is in the second abnormal state, the assist wait time being determined based on the temperature of the working fluid obtained by the temperature obtaining device.

Both the first hydraulic-pressure control mechanism and the second braking-force control mechanism are capable of controlling the braking force to the magnitude greater than or equal to 0. In other words, the first hydraulic-pressure control mechanism and the second braking-force control mechanism are capable of generating and controlling the braking force.

The first abnormal state of the first hydraulic-pressure control mechanism refers to a state in which the hydraulic pressure in the hydraulic brakes is difficult to be controlled in the first hydraulic-pressure control mechanism. The first abnormal state of the first hydraulic-pressure control mechanism is caused in most cases due to an abnormality of the drive source and/or the control system elements included in the first hydraulic-pressure control mechanism or an abnormality in which sufficient electric power is not supplied to the constituent elements of the first hydraulic-pressure control mechanism such as the drive source, for instance.

The second abnormal state of the first hydraulic-pressure control mechanism refers to a state that precedes a state in which the first hydraulic-pressure control mechanism is detected to be in the first abnormal state. For instance, the second abnormal state refers to a state in which it is highly probable that the first hydraulic-pressure control mechanism is detected to be in the first abnormal state.

The temperature obtaining device obtains the temperature of the working fluid in the brake system. The temperature obtaining device may obtain the outside air temperature as the temperature of the working fluid. The temperature obtaining device may estimate the temperature of the working fluid based on the outside air temperature and the operating time of the brake system, for instance.

The second braking-force control mechanism may be a second hydraulic-pressure control mechanism configured to control the hydraulic pressure in the hydraulic brakes, an electric braking-force control mechanism configured to control the braking force of electric brakes provided for the wheels, or a regenerative braking-force control mechanism configured to control a regenerative braking force applied to the vehicle.

The assist wait time may be a length of time that is shorter when the temperature of the working fluid is high than when the temperature of the working fluid is low.

When the first-abnormal-state detecting device does not detect that the first hydraulic-pressure control mechanism is in the first abnormal state, the controller controls not the second braking-force control mechanism but the first hydraulic-pressure control mechanism so as to control the braking force. When the first-abnormal-state detecting device detects that the first hydraulic-pressure control mechanism is in the first abnormal state, the controller controls not the first hydraulic-pressure control mechanism but the second braking-force control mechanism so as to control the braking force.

After a lapse of the assist wait time, the assist control device may control the second braking-force control mechanism without stopping controlling the first hydraulic-pressure control mechanism, so as to control the braking force.

(2) The brake system according to the form (1), comprising a first-actual-hydraulic-pressure obtaining device configured to obtain a first actual hydraulic pressure at intervals of a predetermined cycle time, the first actual hydraulic pressure being an actual hydraulic pressure in the plurality of hydraulic brakes generated by an operation of the first hydraulic-pressure control mechanism, wherein, when the temperature of the working fluid obtained by the temperature obtaining device is not lower than a first set temperature, the first-abnormal-state detecting device monitors, for a first set time, the first actual hydraulic pressure obtained by the first-actual-hydraulic-pressure obtaining device, wherein the first-abnormal-state detecting device detects that the first hydraulic-pressure control mechanism is in the first abnormal state when a difference between the first actual hydraulic pressure and a first target hydraulic pressure is greater than an abnormality determination threshold, wherein, when the temperature of the working fluid is lower than the first set temperature, the first-abnormal-state detecting device monitors, for a second set time that is longer than the first set time, the first actual hydraulic pressure obtained by the first-actual-hydraulic-pressure obtaining device, wherein the first-abnormal-state detecting device detects that the first hydraulic-pressure control mechanism is in the first abnormal state when the difference is greater than the abnormality determination threshold, wherein the second-abnormal-state detecting device monitors, for a third set time that is shorter than the first set time, the first actual hydraulic pressure obtained by the first-actual-hydraulic-pressure obtaining device, and wherein the second-abnormal-state detecting device detects that the first hydraulic-pressure control mechanism is in the second abnormal state when the difference is greater than the abnormality determination threshold.

The third set time may be a length of time in which the first actual hydraulic pressure is obtained by the first-actual-hydraulic-pressure obtaining device and whether the difference is greater than the abnormality determination threshold can be determined once or more than once.

(3) The brake system according to the form (1) or (2), wherein the controller includes an assist-wait-time determining device configured to determine the assist wait time such that the assist wait time is longer when the temperature of the working fluid obtained by the temperature obtaining device is lower than a second set temperature than when the temperature of the working fluid is not lower than the second set temperature.

The second set temperature may be the same as or different from the first set temperature. The assist wait time may be made shorter continuously or discontinuously with an increase in the temperature.

(4) The brake system according to any one of the forms (1)-(3), wherein the controller is configured to determine an operation timing of at least one of the first hydraulic-pressure control mechanism and the second braking-force control mechanism such that the operation timing is earlier when the temperature of the working fluid obtained by the temperature obtaining device is low than when the temperature of the working fluid is high.

The present system may execute an automatic brake control in which the braking force is automatically applied to the own vehicle that is the vehicle on which the present brake system is installed, based on the relative positional relationship between the own vehicle and the object or the like present in the surroundings of the own vehicle. For instance, the automatic brake control may be a control executed in ordinary running of the own vehicle or running for parking. Further, the automatic brake control may be a control executed when the driver is on the vehicle or a control executed when the driver is not on the vehicle (unattended control).

(5) The brake system according to the form (4),
wherein, in a case where the temperature of the working fluid obtained by the temperature obtaining device is not lower than a third set temperature, the controller causes at least one of the first hydraulic-pressure control mechanism and the second braking-force control mechanism to be operated when a relative positional relationship between the vehicle and an object present in surroundings of the vehicle is a first set relationship, and
wherein, in a case where the temperature of the working fluid is lower than the third set temperature, the controller causes at least one of the first hydraulic-pressure control mechanism and the second braking-force control mechanism to be operated even when the relative positional relationship between the vehicle and object is a second set relationship in which the vehicle and the object are less likely to approach each other than in the first set relationship.

The second set relationship may be determined as a relative positional relationship in which the approach speed of the vehicle and the object present in the surroundings of the vehicle is lower and the distance between the vehicle and the object present in surroundings of the vehicle is greater than those in the first set relationship.

(6) The brake system according to any one of the forms (1)-(5), wherein the controller includes an abnormal-state control device configured to control the second braking-force control mechanism so as to control the braking force to be not less than a predetermined abnormal-state target braking force when the first-abnormal-state detecting device detects that the first hydraulic-pressure control mechanism is in the first abnormal state.

(7) The brake system according to any one of the forms (1)-(6),
wherein the controller includes:
a control-command-value generating device configured to generate a control command value based on a running state of the vehicle; and
a brake control device configured to control at least one of the first hydraulic-pressure control mechanism and the second braking-force control mechanism based on the control command value generated by the control-command-value generating device, so as to control the braking force.

The control-command-value generating device generates the control command value based on the running state of the vehicle. The running state of the vehicle may be represented by the running route of the vehicle, the running speed of the vehicle, etc. When a running direction of the vehicle is changed based on the running route of the vehicle, for instance, the vehicle needs to be stopped in some cases. In this instance, the control command value for stopping the vehicle is generated. In a case where an object such as a three-dimensional object or a human is present in the surroundings of the vehicle, the vehicle needs to be stopped for avoiding a collision with the object. In this instance, the control command value is generated based on the approach speed of the vehicle and the object (obtained based on the running speed of the vehicle) and the distance between the vehicle and the object, for instance.

(8) The brake system according to the form (7),
wherein the control-command-value generating device is configured to generate a target deceleration as the control command value,
wherein the brake control device controls the first hydraulic-pressure control mechanism based on the target deceleration when the first-abnormal-state detecting device does not detect that the first hydraulic-pressure control mechanism is in the first abnormal state, and
wherein the brake control device stops the first hydraulic-pressure control mechanism from operating and controls the second braking-force control mechanism based on an abnormal-state target deceleration that is greater than the target deceleration when the first-abnormal-state detecting device detects that the first hydraulic-pressure control mechanism is in the first abnormal state.

(9) The vehicle brake system according to any one of the forms (1)-(8),
wherein the first hydraulic-pressure control mechanism includes: a master cylinder including a pressurizing piston; and a rear-hydraulic-pressure control device configured to control a hydraulic pressure in a rear chamber provided rearward of the pressurizing piston, and
wherein the rear-hydraulic-pressure control device is configured to control a hydraulic pressure in the rear chamber to cause the pressurizing piston to move forward and to thereby control a hydraulic pressure in a pressurizing chamber provided forward of the pressurizing piston.

(10) The brake system according to any one of the forms (1)-(9), wherein the second braking-force control mechanism includes: a pump device disposed between the first hydraulic-pressure control mechanism and wheel cylinders of the plurality of hydraulic brakes and configured to pump up and pressurize a working fluid and to supply the pressurized working fluid to the wheel cylinders; and hydraulic pressure control valves configured to control a hydraulic pressure in the wheel cylinders utilizing a hydraulic pressure of the working fluid ejected from the pump device.

(11) The brake system according to any one of the forms (1)-(10), wherein the controller is configured to determine the assist wait time such that the assist time is shorter when a target hydraulic pressure for the first hydraulic-pressure control mechanism is high than when the target hydraulic pressure for the first hydraulic-pressure control mechanism is low.

(12) A brake system for a vehicle, comprising:
a first braking-force control mechanism configured to control a braking force to be applied to the vehicle;
a second braking-force control mechanism configured to control the braking force, the second braking-force control mechanism being different from the first braking-force control mechanism;
a first-abnormal-state detecting device configured to detect whether the first braking-force control mechanism is in a first abnormal state as an abnormal state; and
a controller configured to:
control the first braking-force control mechanism so as to control the braking force when the first-abnormal-state detecting device does not detect that the first braking-force control mechanism is in the first abnormal state; and
control not the first braking-force control mechanism but the second braking-force control mechanism so as to control the braking force when the first-abnormal-state detecting device detects that the first braking-force control mechanism is in the first abnormal state,
wherein the brake system includes:
a temperature obtaining device configured to obtain a temperature of the brake system; and
a second-abnormal-state detecting device configured to detect whether the first hydraulic-pressure control mechanism is in a second abnormal that the first hydraulic-pressure control mechanism reaches before reaching the first abnormal state, and
wherein the controller includes an assist control device configured to control the second braking-force control mechanism so as to control the braking force when an assist wait time elapses after the second-abnormal-state detecting device has detected that the first braking-force control mechanism is in the second abnormal state, the assist wait time being determined based on the temperature of the brake system obtained by the temperature obtaining device.

The brake system according to this form may employ the technical features described in any of the forms (1)-(11).

What is claimed is:

1. A brake system for a vehicle, comprising:
a first hydraulic-pressure control mechanism configured to control a hydraulic pressure in a plurality of hydraulic brakes respectively provided for a plurality of wheels of the vehicle to thereby control a braking force to be applied to the vehicle;
a second braking-force control mechanism configured to control the braking force, the second braking-force control mechanism being different from the first hydraulic-pressure control mechanism; and
a controller including a first-abnormal-state detecting device configured to detect whether the first hydraulic-pressure control mechanism is in a first abnormal state as an abnormal state,
wherein the controller is configured to:
control the first hydraulic-pressure control mechanism so as to control the braking force when the first-abnormal-state detecting device does not detect that the first hydraulic-pressure control mechanism is in the first abnormal state; and
control not the first hydraulic-pressure control mechanism but the second braking-force control mechanism so as to control the braking force when the first-abnormal-state detecting device detects that the first hydraulic-pressure control mechanism is in the first abnormal state,
wherein the brake system comprises a temperature obtaining device configured to obtain a temperature of a working fluid in the brake system,
wherein the controller includes:
a second-abnormal-state detecting device configured to detect whether the first hydraulic-pressure control mechanism is in a second abnormal state, the second abnormal state being a state that the first hydraulic-pressure control mechanism reaches before reaching the first abnormal state; and
an assist control device configured to control the second braking-force control mechanism so as to control the braking force when an assist wait time elapses after the second-abnormal-state detecting device has detected that the first hydraulic-pressure control mechanism is in the second abnormal state, the assist wait time being determined based on the temperature of the working fluid obtained by the temperature obtaining device.

2. The brake system according to claim 1, comprising a first-actual-hydraulic-pressure obtaining device configured to obtain a first actual hydraulic pressure at intervals of a predetermined cycle time, the first actual hydraulic pressure being an actual hydraulic pressure in the plurality of hydraulic brakes generated by an operation of the first hydraulic-pressure control mechanism,
wherein, when the temperature of the working fluid obtained by the temperature obtaining device is not lower than a first set temperature, the first-abnormal-state detecting device monitors, for a first set time, the first actual hydraulic pressure obtained by the first-actual-hydraulic-pressure obtaining device,
wherein the first-abnormal-state detecting device detects that the first hydraulic-pressure control mechanism is in the first abnormal state when a difference between the first actual hydraulic pressure and a first target hydraulic pressure is greater than an abnormality determination threshold,
wherein, when the temperature of the working fluid is lower than the first set temperature, the first-abnormal-state detecting device monitors, for a second set time that is longer than the first set time, the first actual hydraulic pressure obtained by the first-actual-hydraulic-pressure obtaining device,
wherein the first-abnormal-state detecting device detects that the first hydraulic-pressure control mechanism is in the first abnormal state when the difference is greater than the abnormality determination threshold,
wherein the second-abnormal-state detecting device monitors, for a third set time that is shorter than the first set time, the first actual hydraulic pressure obtained by the first-actual-hydraulic-pressure obtaining device, and
wherein the second-abnormal-state detecting device detects that the first hydraulic-pressure control mechanism is in the second abnormal state when the difference is greater than the abnormality determination threshold.

3. The brake system according to claim 1, wherein the controller includes an assist-wait-time determining device configured to determine the assist wait time such that the assist wait time is longer when the temperature of the working fluid obtained by the temperature obtaining device is lower than a second set temperature than when the temperature of the working fluid is not lower than the second set temperature.

4. The brake system according to claim 1, wherein the controller is configured to determine an operation timing of at least one of the first hydraulic-pressure control mechanism and the second braking-force control mechanism such that the operation timing is earlier when the temperature of the working fluid obtained by the temperature obtaining device is low than when the temperature of the working fluid is high.

5. The brake system according to claim 1, wherein the controller includes an abnormal-state control device configured to control the second braking-force control mechanism so as to control the braking force to be not less than a predetermined abnormal-state target braking force when the first-abnormal-state detecting device detects that the first hydraulic-pressure control mechanism is in the first abnormal state.

6. The brake system according to claim 1,
wherein the controller includes:
    a control-command-value generating device configured to generate a control command value based on a running state of the vehicle; and
    a brake control device configured to control at least one of the first hydraulic-pressure control mechanism and the second braking-force control mechanism based on the control command value generated by the control-command-value generating device, so as to control the braking force,
wherein the control-command-value generating device is configured to generate a target deceleration as the control command value,
wherein the brake control device controls the first hydraulic-pressure control mechanism based on the target deceleration when the first-abnormal-state detecting device does not detect that the first hydraulic-pressure control mechanism is in the first abnormal state, and
wherein the brake control device stops the first hydraulic-pressure control mechanism from operating and controls the second braking-force control mechanism based on an abnormal-state target deceleration that is greater than the target deceleration when the first-abnormal-state detecting device detects that the first hydraulic-pressure control mechanism is in the first abnormal state.

\* \* \* \* \*